(12) United States Patent
Budagavi

(10) Patent No.: US 8,976,860 B2
(45) Date of Patent: Mar. 10, 2015

(54) METHOD AND APPARATUS FOR DETERMINATION OF MOTION ESTIMATION SEARCH WINDOW AREA UTILIZING ADAPTIVE SLIDING WINDOW ALGORITHM

(75) Inventor: Madhukar Budagavi, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 405 days.

(21) Appl. No.: 12/565,464

(22) Filed: Sep. 23, 2009

(65) Prior Publication Data
US 2011/0069751 A1    Mar. 24, 2011

(51) Int. Cl.
*H04N 11/02* (2006.01)
*H04N 19/57* (2014.01)
*H04N 19/137* (2014.01)
*H04N 19/61* (2014.01)

(52) U.S. Cl.
CPC ............. *H04N 19/57* (2014.11); *H04N 19/137* (2014.11); *H04N 19/61* (2014.11)
USPC .................................................. 375/240.02

(58) Field of Classification Search
CPC ....... H04N 7/12; H04N 11/00; H04N 11/002; H04N 11/02; H04N 11/11; H04N 19/00; H04N 19/10; H04N 19/103; H04N 19/137; H04N 19/139; H04N 19/153; H04N 19/134; H04N 19/159
USPC .................. 375/240, 240.01, 240.02, 240.16, 375/240.12; 348/402.1, 413.1
See application file for complete search history.

(56) References Cited

U.S. PATENT DOCUMENTS

| | | | | |
|---|---|---|---|---|
| 5,473,379 | A | * | 12/1995 | Horne ....................... 375/240.16 |
| 6,014,181 | A | * | 1/2000 | Sun .............................. 348/699 |
| 6,877,021 | B2 | * | 4/2005 | Schneider et al. ............ 708/490 |
| 2007/0047657 | A1 | * | 3/2007 | Toma ....................... 375/240.24 |
| 2007/0157231 | A1 | * | 7/2007 | Eldering et al. ................ 725/35 |

* cited by examiner

*Primary Examiner* — Anh Ngoc Nguyen
(74) *Attorney, Agent, or Firm* — Mima Abyad; Frederick J. Telecky, Jr.

(57) ABSTRACT

A method and apparatus for motion estimation utilizing adaptive sliding window algorithm, the method includes estimating motion estimation search window size, transferring data from a previous picture relating to the search window, wherein the size of the search window is determined, and calculating motion vector of the current block by block matching the current block with data of the previous picture in search window.

19 Claims, 3 Drawing Sheets

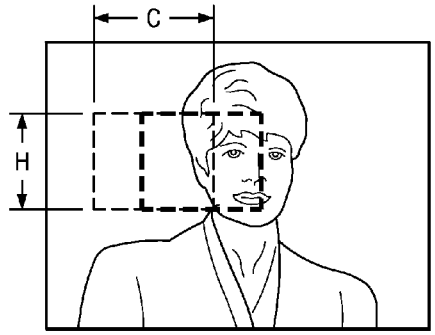 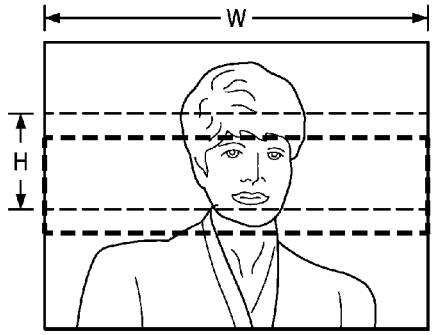
FIG. 1a                FIG. 1b
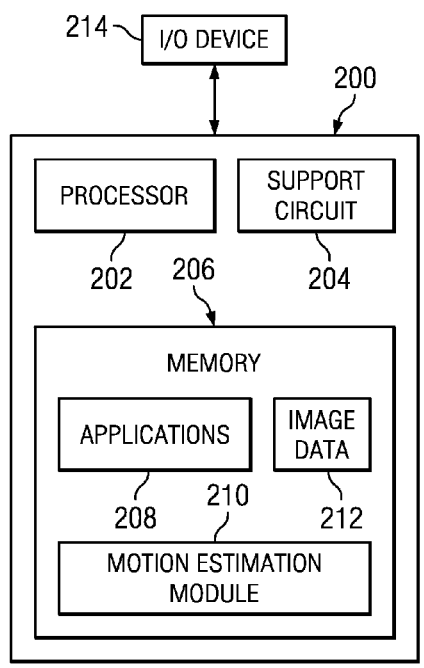 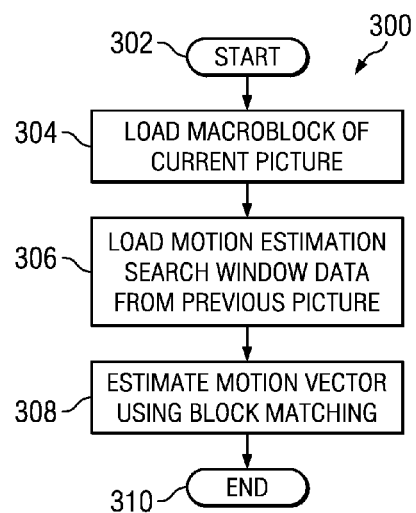
FIG. 2                 FIG. 3

METHOD AND APPARATUS FOR DETERMINATION OF MOTION ESTIMATION SEARCH WINDOW AREA UTILIZING ADAPTIVE SLIDING WINDOW ALGORITHM

BACKGROUND OF THE INVENTION

1. Field of the Invention

Embodiments of the present invention generally relate to a method and apparatus for determination of motion estimation search window area utilizing adaptive sliding window algorithm.

2. Background of the Invention

Motion estimation (ME) block in video coding consumes a significant amount of memory access bandwidth to external memory such as SDRAM. The memory access patterns during ME are fairly regular and caching strategies are typically used to exploit this regularity to reduce memory access bandwidth. FIG. 1 shows the two common caching approaches. FIG. 1(a) shows a sliding window approach and FIG. 1(b) shows a growing window approach.

In the sliding window approach the search window does not cover a complete row of macroblocks as shown in FIG. 1(a). In FIG. 1(a), the solid line box shows the previous search window and the dashed line box shows the current search window. After each macroblock is processed, the sliding window moves to right by one column of macroblocks. Let (C, H) be the (width, height) of sliding window and let N be the number of macroblocks in the picture. The memory bandwidth required without sliding window approach is N*C*H and is equal to N*16*H when sliding window is used. Using sliding window cache reduces bandwidth requirements by a factor of C/16. The internal memory required for the cache is C*H bytes.

In the growing window approach, the search window covers a complete row of macroblocks, as shown in FIG. 1(b). In FIG. 1(b), the solid line box shows the previous search window and the dashed line box shows the current search window. After a complete row of macroblocks is processed, the growing window moves down one row of macroblocks. With the growing window cache system each pixel of reference picture is loaded only once. Hence, the memory bandwidth may required is N*256, which is independent of picture dimensions. However, the internal memory required for the cache is W*H, where W is the width of the picture and H is the height of growing window. W*H can become significantly high for high definition (HD) resolutions and when bi-directional or multi-frame coding is adopted.

The advantage of sliding window approach over growing window approach is that the sliding window approach needs a much smaller cache and is lower in cost. The disadvantage is that the memory bandwidth required for sliding window approach is larger than that required for growing window approach.

Therefore, there is a need for an improved method and apparatus for determination of motion estimation search window area for a picture.

SUMMARY OF THE INVENTION

Embodiments of the present invention relate to a method and apparatus for motion estimation utilizing adaptive sliding window algorithm, the method includes the method includes estimating motion estimation search window size, transferring data from a previous picture relating to the search window, wherein the size of the search window is determined, and calculating motion vector of the current block by block matching the current block with data of the previous picture in search window.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. In this application, a computer readable medium is any medium accessible by a computer for saving, writing, archiving, executing and/or accessing data.

FIG. 1 is an embodiment depicting two common caching approaches. FIG. 1(a) shows a sliding window approach and FIG. 1(b) shows a growing window approach;

FIG. 2 is an embodiment of an apparatus for motion estimation of a picture;

FIG. 3 is a flow diagram depicting an embodiment of a method for motion estimation for a picture;

DETAILED DESCRIPTION

Figure 4:
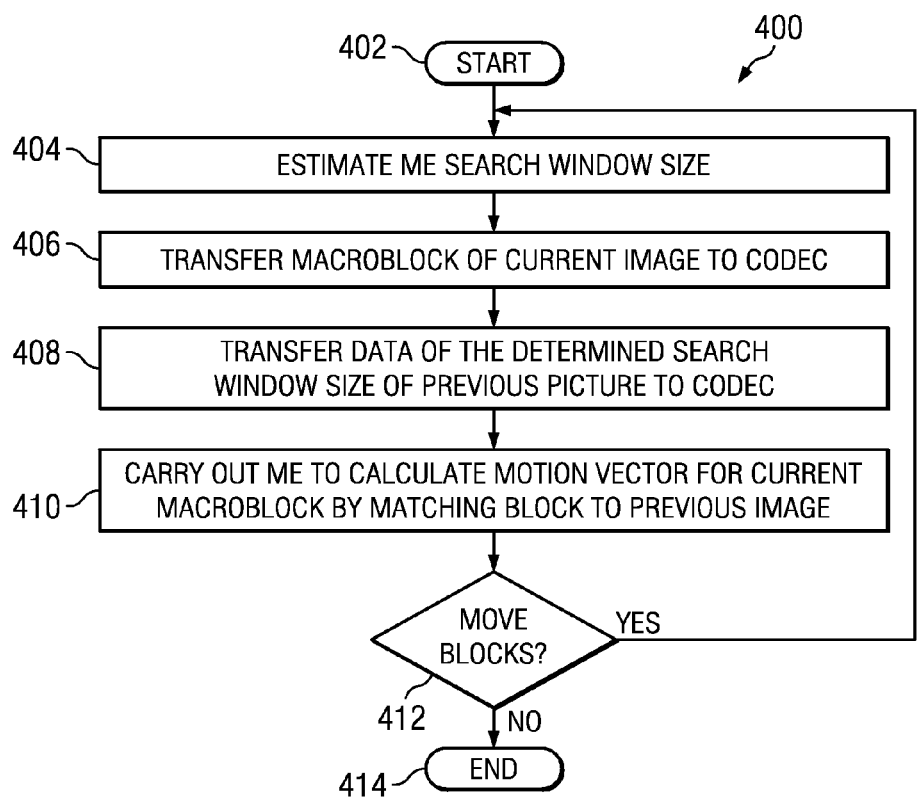
FIG. 4 is a flow diagram depicting an embodiment of a method 400 for dynamically changing the motion estimation search window area for calculating the motion vector of a block of a picture.

In one embodiment, the algorithm is capable of adaptively changing the size of motion estimation sliding window depending on the motion in the sequence. By using this algorithm we are able to reduce motion estimation memory bandwidth by an average 28.6% on 23 HD sequences in our video database (at the cost of 0.01 dB average degradation) when carry out motion estimation with sliding window. Further reduction in memory bandwidth is possible by using this algorithm to adaptively switch between sliding window and growing window approaches. We can also use this algorithm to trade-off horizontal and vertical search range and improve video quality on systems that have less on-chip cache memory. Using this algorithm we can also do statistical bandwidth allocation to different video channels in multi-channel video encoding to maximize video quality given a total bandwidth limit for multi-channel video encoding.

FIG. 2 is an embodiment of an apparatus 200 for determining motion estimation of a picture. The apparatus 200 includes a processor 202, support circuitry 204, memory 206. The processor 202 may comprise one or more conventionally available microprocessors. The microprocessor may be an application specific integrated circuit (ASIC). The support circuits 204 are well known circuits used to promote functionality of the processor 202. Such circuits include, but are not limited to, a cache, power supplies, clock circuits, input/output (I/O) circuits and the like. The memory 206 may comprise random access memory, read only memory, removable disk memory, flash memory, and various combinations of these types of memory. The memory 206 is sometimes referred to main memory and may, in part, be used as cache memory or buffer memory. The memory 206 may store an operating system (OS), database software, statistical data and various forms of application software, such as, applications 208 and motion estimation module 210. It should be noted that the method apparatus 200 may be incorporated into or coupled to an encoder, video/image stream generator or the like.

The applications 208 are any applications that are stored or utilized by the apparatus 200, such as an encoder (for example, Codec), compressor, decompressor, encryptor, decryptor and the likes. The motion estimation module 210 is utilized to the methods described in FIG. 3 and FIG. 4. The motion estimation module 210 may access data in an image data 212. The data in the image data 212 may be retrieved from an input/output (I/O) device 214 or data manipulated or calculated by the motion estimation module 210. The I/O devices 214 may include video or image stream generators, encoders, data compression devices and the likes.

FIG. 3 is a flow diagram depicting an embodiment of a method 300 for motion estimation for a picture. The method 300 starts at step 302 and proceeds to step 304. At step 304, the method 300 retrieves macroblock of the current picture. At step 306, the method retrieves motion estimation search window from a previous picture. At step 308, the method 300 estimates the motion vector using block matching. The method 300 ends at step 310.

FIG. 4 is a flow diagram depicting an embodiment of a method 400 for dynamically changing the area for motion estimation of a block of an image. The method starts at step 402 and proceeds to step 404. At step 404, the method 400 estimates the motion estimation search window size. At step 406, the method 400 transfers macroblock of current image to Codec. At step 408, the method 400 transfers to Codec data relating to the determined window size of the previous image. At step 410, the method 400 carries out the motion estimation to calculate the motion vector for the current macroblock by block matching current macroblock with data in search window. The data may contain information relating to the previous image.

Figure 6:
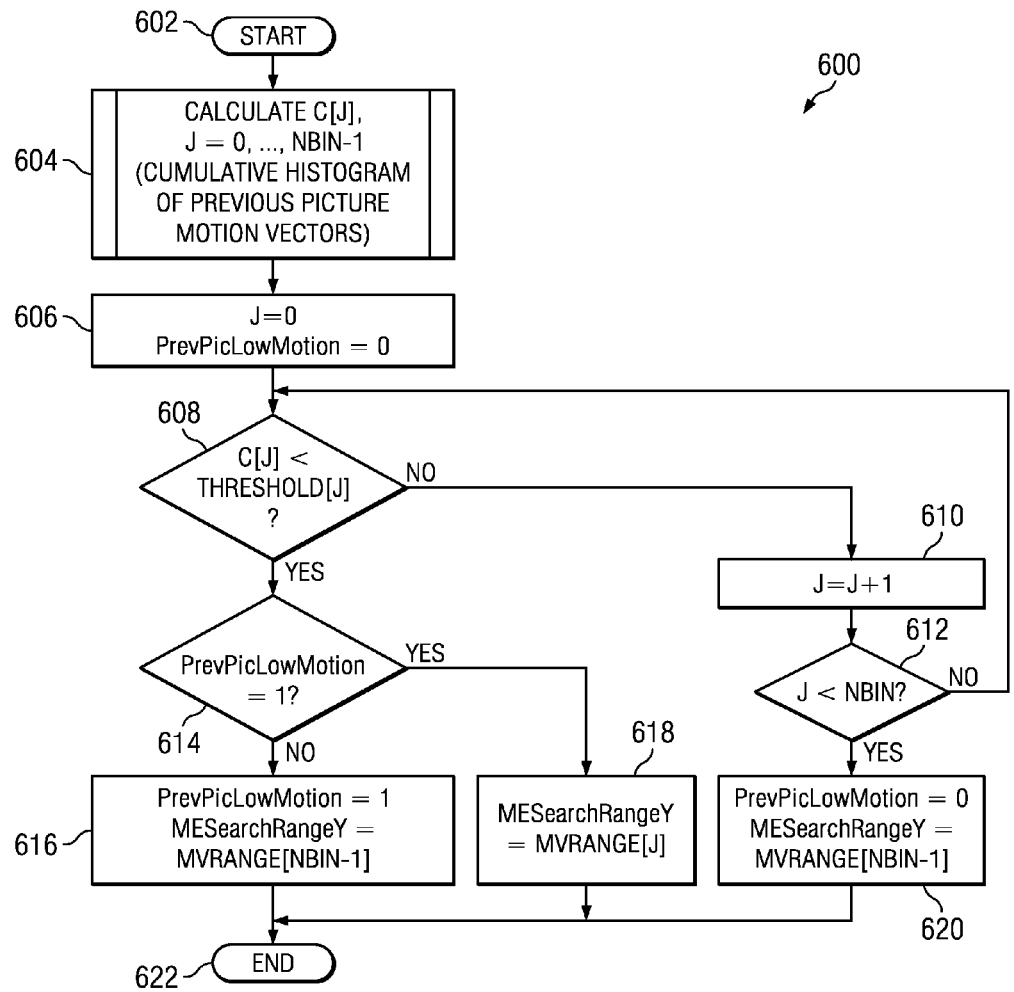
FIG. 6 is an embodiment of a method for determining the motion estimation search range.

In one embodiment, the adaptive sliding window algorithm carries out processing as shown in flowchart of FIG. 6, wherein:

INPUT:

NBIN: Number of bins of cumulative histogram to calculate
MVRANGE[J]: Cumulative histogram bin edges. J = 0, . . . , NBIN-1.
NumNonIntraMBs: Number of non-Intra macroblocks in picture
MVY: Y-component of motion vector (one motion vector per macroblock)
GMVY: Global motion vector for picture
THRESHOLD[J]: Threshold used to determine search range. J = 0, . . . , NBIN-1.
INTERMEDIDATE VARIABLES:

C[J]: Cumulative histogram value. J = 0, . . . , NBIN-1.
PrevPicLowMotion: Flag to signal whether previous picture has "low" motion

OUTPUT:

MESearchRangeY: ME search window height to use for macroblocks in current picture.

FIG. 6 is an embodiment of a method 600 for determining the motion estimation search range. First, cumulative histogram values C[J] of the previous motion vector are calculated for the picture. As follows:
C[J]=0, J=0 . . . , NBIN-1
C[J]=Number of non-intra macroblocks with |MVY-GMVY|>MVRANGE[J], J=0, . . . NBIN-1
C[J]=C[J]/NumNonIntraMBs The histogram values C[J] are compared with thresholds THRESHOLD[J] to determine the motion estimation search range to use for next picture. The method 600 starts at step 602 and proceeds to step 604. At step 604, C[J] is calculated. At step 606, J and PrevPicLowMotion are set to Zero (0). If C[J] is less than the threshold, then the method proceeds to step 610, wherein J is set to J+1. From step 610, the method proceeds to step 612 wherein the method 600 determines if J is less than NBIN. If J is greater than NBIN, then the method 600 proceeds to step 608; otherwise the method 600 proceeds to step 620, wherein PrevPicLowMotion is set to Zero (0) and MESearchRangeY is set to MVRANGE[NBIN-1].

If C[J] is greater than the threshold, the method 600 proceeds to step 614. At step 614, the method determines if PrevPicLowMotion is equal to one (1). If PrevPicLowMotion is not one, the method 600 proceeds to step 616, wherein PrevPicLowMotion is set to one (1) and is set to MVRANGE [NBIN-1]; otherwise, the method 600 proceeds to step 618, wherein MESearchRangeY is set to MVRANGE[J]. From steps 616, 618 and 620, the method 600 proceeds to step 622. At step 622, the method 600 ends.

Such as algorithm decides on search window height on picture level. The algorithm can be modified to adaptively choose search window heights at a row of macroblock level too since the sliding window is reset at the beginning of each row of macroblocks.

Table 1 below lists the BD-PSNR degradation and bandwidth savings on 23 HD sequences in our video database when carrying out motion estimation with adaptive sliding window when compared to fixed sliding window of size 304× 80. We achieve an average memory bandwidth savings of around 28.62% at the cost of about 0.01 average PSNR degradation. The worst case degradation is 0.08 dB and the best case bandwidth savings is 37.34%.

TABLE 1

BD-PSNR degradation and bandwidth savings for adaptive sliding window algorithm

| Video sequence name | BD-PSNR between fixed and adaptive sliding windows | Fixed sliding window bandwidth (bytes/macroblock) | Adaptive sliding window bandwidth (bytes/macroblock) | Percent savings in bandwidth |
|---|---|---|---|---|
| catriverbedvipertrain | −0.01 | 80 | 64.31 | 19.61 |
| sbreach | −0.03 | 80 | 61.87 | 22.67 |
| sfadevipertraffic | 0 | 80 | 52.73 | 34.09 |
| sfountain | 0 | 80 | 50.13 | 37.34 |
| sIceHockey | 0 | 80 | 50.13 | 37.34 |
| sjuggle | −0.01 | 80 | 50.13 | 37.33 |
| smaninrest | 0 | 80 | 50.13 | 37.34 |
| smotionvipertraffic | −0.01 | 80 | 52.71 | 34.11 |
| sPanIceHockey | 0 | 80 | 50.13 | 37.34 |
| sriverbed | 0 | 80 | 64.62 | 19.22 |

TABLE 1-continued

BD-PSNR degradation and bandwidth savings for adaptive sliding window algorithm

| Video sequence name | BD-PSNR between fixed and adaptive sliding windows | Fixed sliding window bandwidth (bytes/macroblock) | Adaptive sliding window bandwidth (bytes/macroblock) | Percent savings in bandwidth |
| --- | --- | --- | --- | --- |
| ssunflower | 0 | 80 | 50.13 | 37.34 |
| stractor | −0.04 | 80 | 50.13 | 37.34 |
| svconf9 | −0.04 | 80 | 52.76 | 34.06 |
| svconf101 | 0 | 80 | 50.13 | 37.34 |
| svconf102 | −0.01 | 80 | 50.13 | 37.34 |
| sviperpouringliquids | −0.01 | 80 | 52.98 | 33.78 |
| svipertrain | −0.08 | 80 | 60.98 | 23.78 |
| snoreservations | −0.02 | 80 | 63.86 | 20.17 |
| sparkjoy | 0.02 | 80 | 50.12 | 37.35 |
| sgoldendoor | −0.01 | 80 | 78.18 | 2.28 |
| sfish | 0 | 80 | 70.09 | 12.39 |
| sfoolsgold | 0 | 80 | 71.38 | 10.78 |
| sfire | −0.02 | 80 | 65.64 | 17.94 |
| Average | −0.012 | 80 | 57.10 | 28.62 |

Figure 5:
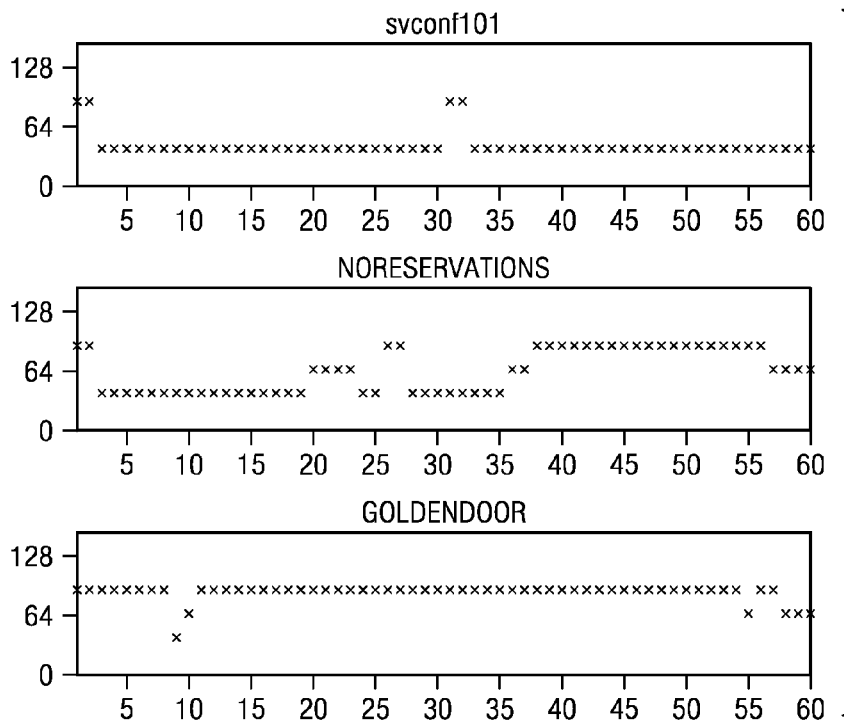
FIG. 5 is Plots of vertical size of search window versus picture number.

FIG. 5 depicts an embodiment for the tracking ability of an adaptive sliding window algorithm on three example video sequences. Svconf101 is a videoconference sequence with low motion. The adaptive sliding window algorithm decides that vertical size of search window to use is 48. The data points with vertical size of 80 in the svconf101 figure correspond to I-picture and the next P-picture (which does not have motion information from the past I-picture to decide on search range leading us to use the maximum of 80). Goldendoor is a sequence with high motion. In this case the sliding window algorithm decides to use the maximum vertical size of 80. Noreservations is a sequence with motion that varies with time. Initial parts of the sequence have low motion and latter parts of sequence have high motion. Our algorithm is able to track the motion and use smaller search range in the initial regions and larger search range in the latter regions.

Utilizing adaptive sliding window, one may achieve further reduction in memory bandwidth by using adaptive sliding window algorithm to adaptively switch between sliding window and growing window approaches. If the search window height fits within a growing window, for example, growing window height>=search window height, a system or apparatus may switch to growing window, otherwise sliding window may be utilized.

In IBBP coding, for P-pictures the search window size is determined as in previous section. For B-pictures, the sliding window size can be determined in the following ways (1) B-picture search window size is fraction of P-picture search window size, and (2) Extending processing described in Section [0019] to take care of B-pictures.

In one embodiment, adaptive sliding window algorithm may be utilized to increase search window size in either horizontal or vertical direction and improve video quality on systems that have less on-chip cache memory. E.g. For a fixed cache size and for a video sequence with large horizontal motion, vertical size of the search window can be decreased and horizontal size increased.

In a multi-channel video encoding scenario, one can use the adaptive sliding window algorithm to allocate bandwidth amongst multiple channels based on motion in them. Hence, maximizing video quality give a total bandwidth limit.

While the foregoing is directed to embodiments of the present invention, other and further embodiments of the invention may be devised without departing from the basic scope thereof, and the scope thereof is determined by the claims that follow.

What is claimed is:

1. A method for a digital processor for determining motion estimation utilizing adaptive sliding window algorithm, the method comprising:
   estimating via the digital processor motion estimation search window size;
   transferring data from a previous picture relating to the search window, wherein the size of the search window is determined and wherein the motion estimation search window size adaptively changes size to create a sliding window that changes size based on the motion to smaller size when motion is low and larger size when motion is high; and
   calculating motion vector of the current block by block matching the current block with data of the previous picture in search window utilizing both the sliding window and motion estimation size determination.

2. The method of claim 1, wherein the step of transferring data relating to previous picture comprises calculating a cumulative histogram of the previous picture.

3. The method of claim 1, further comprising transferring data to an encoder.

4. The method of claim 1, wherein the method is repeated for each block of the current image.

5. The method of claim 1, wherein the method further comprises utilizing adaptive sliding window algorithm to adaptively switch between sliding window and growing window approaches.

6. The method of claim 5, wherein the adaptive sliding window algorithm is utilized for allocating bandwidth amongst multiple channels based on motion in the channels, wherein the bandwidth relates to memory bandwidth.

7. An apparatus for determining motion estimation utilizing adaptive sliding window algorithm, comprising:
   means for estimating motion estimation search window size;
   means for transferring data from a previous picture relating to the search window, wherein the size of the search window is determined, wherein the motion estimation search window size is adaptively changes size to create a sliding window that changes size based on the motion to smaller size when motion is low and larger size when motion is high; and means for calculating motion vector of the current block by block matching the current block with data of the previous picture in search window utilizing both the sliding window and motion estimation size determination.

8. The apparatus of claim 7, wherein the means for transferring data relating to previous picture comprises calculating a cumulative histogram of the previous picture.

9. The apparatus of claim 7 further comprising means for transferring data to an encoder.

10. The apparatus of claim 7, wherein the apparatus processes each block of the current image.

11. The apparatus of claim 7, wherein the method is repeated for each block of the current image.

12. The apparatus of claim 7 further comprises a means for utilizing adaptive sliding window for adaptively sliding a window algorithm to adaptively switch between sliding window and growing window approaches.

13. The apparatus of claim 12, wherein the adaptive sliding window algorithm is utilized for allocating bandwidth amongst multiple channels based on motion in the channels, wherein the bandwidth relates to memory bandwidth.

14. A non-transitory computer readable medium comprising software that, when executed by a processor, causes the processor to perform a method for determining motion estimation utilizing adaptive sliding window algorithm, the method comprising:

estimating motion estimation search window size;

transferring data from a previous picture relating to the search window, wherein the size of the search window is determined, wherein the motion estimation search window size is adaptively changes size to create a sliding window that changes size based on the motion to smaller size when motion is low and larger size when motion is high; and calculating motion vector of the current block by block matching the current block with data of the previous picture in search window utilizing both the sliding window and the motion estimation size determination.

15. The computer readable medium of claim 14, wherein the step of transferring data relating to previous picture comprises calculating a cumulative histogram of the previous picture.

16. The computer readable medium of claim 14, the method further comprising transferring data to an encoder.

17. The computer readable medium of claim 14, wherein the method is repeated for each block of the current image.

18. The computer readable medium of claim 14, wherein the method further comprises utilizing adaptive sliding window utilizing adaptive sliding window algorithm to adaptively switch between sliding window and growing window approaches.

19. The computer readable medium of claim 18, wherein the adaptive sliding window algorithm is utilized for allocating bandwidth amongst multiple channels based on motion in the channels, wherein the bandwidth relates to memory bandwidth.

* * * * *